United States Patent [19]

Ramus et al.

[11] Patent Number: 4,654,067
[45] Date of Patent: Mar. 31, 1987

[54] METHOD FOR MAKING AN ELECTRICALLY HEATABLE WINDSHIELD

[75] Inventors: Kevin J. Ramus, Dearborn; John D. Youngs, Rockwood, both of Mich.

[73] Assignee: Ford Motor Company, Dearborn, Mich.

[21] Appl. No.: 823,233

[22] Filed: Jan. 28, 1986

[51] Int. Cl.$^4$ .................... C03C 17/23; C03B 23/023
[52] U.S. Cl. ...................... 65/60.5; 65/60.2; 65/60.51; 65/60.53; 65/107
[58] Field of Search ............... 65/60.2, 60.51, 60.52, 65/60.53, 64, 106, 107, 60.5

[56] References Cited

U.S. PATENT DOCUMENTS

| | | | |
|---|---|---|---|
| 2,795,084 | 6/1957 | Littleton | 65/60.51 X |
| 3,078,693 | 2/1963 | Lytle | 65/60.2 |
| 3,721,594 | 3/1973 | Tarnopol et al. | 65/107 X |
| 3,762,902 | 10/1973 | Wagner et al. | 65/60.2 |
| 3,880,636 | 4/1975 | Tobin et al. | 65/107 |
| 4,548,836 | 10/1985 | Middleton et al. | 65/60.2 |

FOREIGN PATENT DOCUMENTS 0108616  5/1984  European Pat. Off. ............ 65/60.53

Primary Examiner—Arthur Kellogg
Attorney, Agent, or Firm—William E. Johnson; Clifford L. Sadler

[57] ABSTRACT

This specification teaches a method for making an electrically heatable windshield of laminated construction. In the method, a pair of glass templets are cut (10) and they include a long glass templet and a short glass templet. The templets are separated (20) from one another. An opaque ceramic paint is applied (30) to an edge portion of a coatable surface of a selected glass templet and is dried (40) thereon. Bus bars are also applied (50) to and dried (60) on the coatable surface of the long glass templet. The glass templets are united (70) and subjected to a bending operation (80) to form a shaped windshield pair. The long glass templet and short glass templet are separated (90). A transparent electrically conductive coating is applied (100) between the bus bars located on the selected glass templet. The templets are reunited (110) with an interposed laminating interlayer material and thereafter laminated (120) together to achieve a shaped laminated windshield which is heatable by the flow of electrical energy therethrough.

3 Claims, 1 Drawing Figure

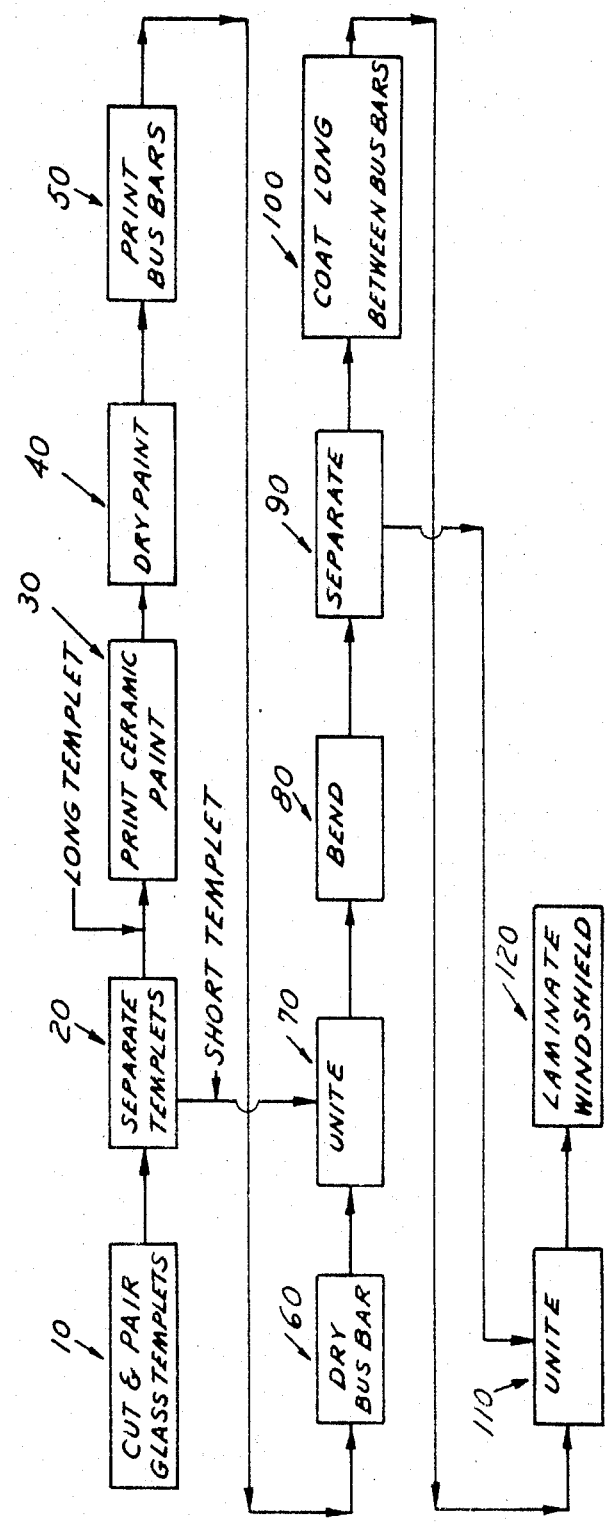

METHOD FOR MAKING AN ELECTRICALLY HEATABLE WINDSHIELD

TECHNICAL FIELD

This application is directed to a method of making an electrically heatable windshield which finds principal use as the windshield vision unit of a vehicle such as a motor vehicle. The electrically heatable windshield is one which may be defogged and deiced by application of an electrical current to an electrically conductive coating within the windshield of laminated construction. Generally the electrically conductive coating, which covers most of a windshield surface, is transparent to radiation in the visible wavelength range.

BACKGROUND AND PRIOR ART STATEMENT

Motor vehicles, as presently manufactured, are equipped with systems for defogging and deicing windshields. Generally these systems depend upon heat generated in the internal combustion engine of the vehicle and transferred to the engine's cooling system to be blown as warm air across the interior of the windshield to accomplish the defogging and deicing. In such a case, of course, it is readily apparent that there is a period of time between the starting of an engine of a vehicle and the time that sufficient heat is being generated in its cooling system in order to provide a defogging and deicing of the vehicle's windshield. Depending upon the exact temperature conditions and the time the vehicle has been sitting idle without its engine running, the period of time before sufficient heat is available to accomplish this defogging and deicing function can be up to 10 minutes or more.

In view of the fact that there can be a rather lengthy delay before the present day motor vehicles heating and defrosting systems can clear a windshield, automotive designers had been attempting to design systems which generate heat from electrical energy to accomplish a relatively rapid defrost and deicing of a vehicle windshield. Such an electrically heated defrosting and deicing system generally would be independent of the normal heating and defrosting system contained in the motor vehicle.

Many different systems have been proposed for accomplishing this rapid defrost and deicing function, including the placement of an electrically conductive transparent coating on the windshield and the embedding of fine wires in a laminating interlayer of the windshield. To the best of our knowledge, there are no such rapid defrost and deicing systems in vehicles which are currently sold in the U.S. market, except windshields which are made in accordance with the method of our invention which are to be introduced into the U.S. market in 1986 on vehicles produced and sold by Ford Motor Company, the assignee of this application. We believe that no previous systems have been introduced because of the relatively high cost of such systems, and also because of electrical problems associated with installation of such a system in a vehicle windshield such as found in today's automobiles. The method set forth by us in this specification is one which produces an electrically heatable windshield of laminated construction which is of relatively moderate price and which can be rapidly defogged and deiced by application of electrical energy thereto in a period of time substantially shorter than can be achieved by defogging and deicing of the windshield using the normal defogging and deicing system of that vehicle.

A search on the subject matter of this disclosure was conducted by Mr. Kevin J. Ramus, one of the inventors herein, in the U.S. Patent and Trademark Office. Mr. Ramus did not uncover in his search any patents which appear to be relevant to the subject matter of this specification.

DISCLOSURE OF INVENTION

This invention is directed to a method for making an electrically heatable windshield and, more particularly, to a method for making an electrically heatable windshield of laminated construction.

In accordance with the preferred teachings of the method of our invention, an electrically heatable windshield of laminated construction is made in the following manner.

A pair of glass templets are cut from suitable glass brackets. The pair of glass templets includes a long glass templet and a short glass templet as those terms are used in the art. Basically, the long glass templet forms the outer portion of the windshield and the short glass templet forms the inner portion of the windshield. The long glass templet and the short glass templet are separated from one another after the cutting operation.

An opaque ceramic paint is applied to an edge portion of a coatable surface of a selected one of the glass templets. The surface to which the opaque ceramic paint is applied is the surface which will face a laminating interlayer when the windshield is in an installed position in a vehicle. The ceramic paint is dried to bond that ceramic paint to the coatable surface of the selected glass templet.

Electrically conductive bus bars are applied to the coatable surface of the selected glass templet. Generally these electrically conductive bus bars are applied over the ceramic paint which has been placed on the coatable surface of the selected glass templet. The bus bars are also dried to bond the bus bars to the coatable surface of the selected glass templet or to the ceramic paint if applied over the ceramic paint.

The long glass templet and the short glass templet are once again united. The united long glass templet and the short glass templet are bent in a bending operation to form a shaped windshield pair. The shaped windshield pair is one in which the long glass templet defines the sheet of glass which will face the exterior of the vehicle and the short glass templet is the one which will face the interior of the vehicle.

After the bending of the long glass templet and the short glass templet, the two templets are separated from each other. After separation, a transparent electrically conductive coating is applied between the bus bars located on the coatable surface of the selected glass templet. Generally, the electrically conductive coating is applied in a vacuum sputtering operation in which a suitable conductive metal or metal/metal oxide combination is applied to the defined surface.

After the application of the electrically conductive coating, the long glass templet and the short glass templet are once again united with an interposed laminating interlayer placed therebetween. The long glass templet and the short glass templet are then laminated together with the interposed laminating interlayer thereby to achieve a shaped laminated windshield which is heatable by the flow of electrical energy therethrough.

Preferably, the selected glass templet is the long glass templet.

The systems for providing the electrical energy to the bus bars requires leads to the bus bars and a suitable device for generating the electrical energy needed, all of which is available to a skilled artisan. If desired, the short glass templet may have a notch therein which allows attachment of the leads to the bus bars.

BRIEF DESCRIPTION OF THE DRAWINGS

The novel features that are considered characteristics of the invention are set forth with particularity in the appended claims. The invention itself, however, both as to its organization and its method of operation, together with additional objects and advantages thereof, will best be understood from the following description of specific embodiments when read in connection with the accompanying drawing which is a schematic outline of the steps involved in the method of our invention.

BEST MODE AND INDUSTRIAL APPLICABILITY

The following description is what we consider to be a preferred embodiment of the method for making an electrically heatable windshield of laminated construction in accordance with our inventive concept. The following description also sets forth what we now contemplate to be the best mode of carrying out our method for making an electrically heatable windshield of laminated construction. This description is not intended to be a limitation upon the broader principles of our method, and while preferred materials are used in our method in accordance with the requirements of the laws, it does not mean that other materials cannot be used in our method.

A method for making an electrically heatable windshield of laminated construction in accordance with the teachings of our invention is initiated in the following manner, as is graphically depicted in the drawing associated with this specification.

The first step of our method, generally identified by the numeral 10, is one in which glass templets are cut and paired. Basically, in this operation, individual glass templets are cut from suitable glass brackets. Normally, the pair of glass templets includes a long glass templet and a short glass templet. The long glass templet is slightly larger than the short glass templet and it forms the outside of the windshield construction. The short glass templet is smaller in size than the long glass templet and it forms the interior of the finished windshield construction. The short glass templet is smaller than the long glass templet because the point from which the radius of curvature for the bend of the bent glass templets is located on the short templet side of the windshield. Therefore, in their final curved position, the edges of the short glass templet and the long glass templet will coincide because their radius of curvature are different with the long glass templet having the greatest radius curvature.

After the cutting operation, the second step of our method, generally identified by the numeral 20, is one in which the short glass templet and the long glass templet are separated from one another. These two templets will be reunited at another location downstream in the processing operation.

After its separation, in accordance with our preferred embodiment, the long glass templet is printed with a ceramic paint in the third step of our process, generally identified by the numeral 30. Normally, the ceramic paint applied is an opaque paint, and it is applied to an edge portion of a coatable surface of the long glass templet. Normally, the coatable surface of the long glass templet is the surface which will face the interior of the vehicle when the windshield is in an installed position in that vehicle. This coatable surface is also the surface which will contact the laminating interlayer when the long glass templet and the short glass templet are laminated together. Normally, the ceramic paint used is a lead borosilicate frit filled with opacifiers and colorants suspended in a liquid. This paint is generally applied to the coatable surface of the glass sheet in a silk screen operation. Normally, the ceramic paint is applied around the entire perimeter of the glass templet for asthetic purposes. The opaque band serves as a way of blocking the view from the exterior of the vehicle to locations under moldings, instrument panels and the like which would otherwise be visible if such an opaque border was not applied.

In the fourth step of the method of our invention, generally identified by the numeral 40, the opaque ceramic paint is dried. This drying operation may be a prefiring of the ceramic paint. Normally, the drying operation which acts as a prefiring of the ceramic paint takes place at a temperature of 1150° F. for a period of time in the range of 2-4 minutes, depending on the size and shape of the glass templet. However, the paint drying operation may take place for a period of time and at a temperature suitable for the particular type of materials used to form the ceramic paint. The drying operation is one which gives a fairly sufficient bond between the remaining portion of the ceramic paint and the glass surface so that the material does not smudge or become removed when contacted by other materials or by normal handling operations. Although the preferred drying step causes a prefiring of the ceramic paint, the ceramic paint may be just dried at temperatures which will not result in a prefiring thereof. For example, if the ceramic paint is formulated of a medium sensative to ultraviolet (UV), the ceramic paint can be UV dried before further processing. Oil base ceramic paints may be air dried or oven dried (75°–1350° F.) depending on the time allowable for the drying stage. Air drying will take several days, whereas oven drying can take less than one minute. Additional precautions must be taken, however, when handling ceramic paints that have not been prefired in the drying process.

In the fifth step of our method, generally identified by the numeral 50, electrically conductive bus bars are applied to the coatable surface of the long glass templet. Generally these bus bars are applied primarily over the ceramic paint which has been previously applied. However, the bus bars may also be applied in part over the ceramic paint and in part over the coatable surface of the long glass templet. If one desires, the electrical bus bars may be printed in their entirety on the coatable surface of the long glass templet. However, it is preferable to apply most if not all of the electrically conductive bus bars on the ceramic paint so that the bus bars are not visible from the exterior of the motor vehicle. The bus bars are generally made from a silver ceramic material as is known in the art. The bus bars formed of this material are applied to the surface of the windshield to which the conducting coating is to be applied by a silk screen printing operation. Normally, the bus bars are printed and the printing material used is a liquid. For example, a suitable material is 86% silver, 5% borosilicate frit, 6% pine oil, and 3% polycarbonate acetate.

After the fifth step of the method, 50, in which the electrically conductive bus bars are applied to the long glass templet, the long glass templet is then subjected to the sixth step in our method, generally identified by the numeral 60. In the sixth step, the bus bar material is dried to bond the bus bars to the surface of the long glass templet. The drying operation is generally carried out at a temperature in a range of 1150°–1200° F. for a period of time of 2–4 minutes. In the preferred case, the drying step results in a prefiring of the bus bar material. Once again, the specific drying time and temperature are dependent upon the exact materials used to print the bus bars on the surface of the long glass templet and the size and thickness of the glass templets. The drying is sufficient to bond the bus bar materials to the long glass templet so that such materials can withstand contact therewith of another glass sheet and not be scrapped or dislodged therefrom. Also, the bonding operation is sufficient so that the long glass templet may be handled in normal handling operations without any of the bus bar materials being removed therefrom.

In the seventh step of our method, generally identified by the numeral 70, the long glass templet and the short glass templet are reunited. The reunited glass templets are placed on a suitable bending fixture and directed through a glass bending furnace.

The glass templets are subjected to the eight steps of our method, generally identified by the numeral 80, in the glass bending furnace in which the glass templets are heated to a temperature sufficient to soften the same so that they may be bent to the desired radius as a paired unit while on the glass bending fixture. Such a bending operation is well known to those skilled in the art. During this bending operation, there is relative movement between the juxtaposed surfaces of the long glass templet and the short glass templet. However, since in the preferred embodiment the opaque ceramic paint and the electrically conductive bus bars have been applied to the surface of the long glass templet and have been prefired thereon during the drying operation, there is no scrapping or removing of these materials by the relative movement of the two surfaces with respect to one another. Prefiring during the drying operation also prevents sticking of the long and the short glass templets when they come in contact with one another.

In the ninth step of our method, generally indicated by the numeral 90, the long glass templet and the short glass templet which have been bent to form a shaped windshield pair are separated. As is well known in the art, the shaped pair is unique, and if one of the two templets is broken in subsequent handling operations, both must be discarded as either individual templet cannot be used with another templet.

In the tenth step of our method, generally identified by the numeral 100, the long glass templet is coated between the bus bars by applying a transparent electrically conductive coating between the bus bars located on the coatable surface of the long glass templet. The electrically conductive coating applied to the surface is one that may be applied, for example, by a magnetron sputtering operation. Magnetron sputtering of glass surfaces is well known in the art. In accordance with a preferred embodiment of this invention, the materials used as target materials in the magnetron sputtering device are zinc and silver, and the resulting coating applied to the windshield is a multilayer coating consisting of zinc oxide and a mixture of silver and zinc oxide which forms a coating which is electrically conductive. By electrically conductive, we mean that electric current, either AC or DC, can be passed across the silver containing coating between the bus bars when a suitable potential is applied to those bus bars.

In the eleventh step of our method, generally identified by the numeral 110, the long glass templet and the short glass templet are once again united. In this case, however, a laminating interlayer material is interposed between the glass templets in anticipation of a laminating operation. A normal laminating material is polyvinylbutryl which is well known to those skilled in the art.

The twelfth and last step of the method, generally identified by the numeral 120, is that of laminating the windshield in a laminating operation. Such laminating operations are well known to those skilled in the art. The operation generally involves applying heat and pressure to the united long and short templets with the interposed laminating material therebetween. In such a laminating operation, the laminating material is rendered transparent and it is effective to bond the long and short glass templets into a single laminated windshield construction in which the surfaces of the glass sheet contacting the laminating material are in bonding relationship with that material in order to form a laminated sandwich.

Generally, cut out portions are provided in the glass templets so that electrical contact can be made with the bus bars on the laminated windshield. When electrical contact is made to such areas and such areas are connected to a suitable source of electrical energy, as, for example, the electrical system of the motor vehicle, the windshield may be heated by passing electrical current through the electrical conductive coating thereon. The passage of electrical energy, of course, generates a resistance heating of the conductive coating which, in turn, allows a defrosting and deicing of the windshield in the vehicle as is required. The design of the electrical supply system and connections necessary is well within the skill of an artisan.

While particular embodiments of the invention have been illustrated and described, it will be obvious to those skilled in the art that various changes and modifications may be made without departing from the invention, and it is intended to cover in the appended claims all such modifications and equivalents as fall within the true spirit and scope of this invention.

We claim:

1. A method for making an electrically heatable windshield of laminated construction, which comprises the steps of:

cutting a pair of glass templates, said templates including a long glass template and a short glass templet;

separating said long and said short glass templet from one another;

applying an opaque ceramic paint to an edge portion of a coatable surface of a selected one of said glass templets which will face a laminating interlayer when the windshield is in an installed position in a vehicle;

drying said ceramic paint to bond said ceramic paint to said coatable surface of said selected glass templet;

applying electrically conductive bus bars to said coatable surface of said selected glass templet;

drying said bus bars to bond said bus bars to said coatable surface of said selected glass templet;
uniting said long glass templet and said short glass templet;
bending said long glass templet and said short glass templet to form a shaped windshield pair;
separating said long templet and said short templet forming said shaped windshield pair;
applying a transparent electrically conductive coating between said bus bars located on said coatable surface of said selected glass templet;
uniting said long glass templet and said short glass templet with an interposed laminating interlayer therebetween; and
laminating said long glass templet and said short glass templet with said interposed laminating interlayer thereby to achieve a shaped laminated windshield which is heatable by the flow of electrical energy therethrough.

2. A method for making an electrically heatable windshield of laminated construction, which comprises the steps of:
cutting a pair of glass templates, said templates including a long glass template and a short glass templet;
separating said long and said short glass templet from one another;
applying an opaque ceramic paint to an edge portion of a coatable surface of said long glass templet which will face the interior of a vehicle when the windshield is in an installed position in that vehicle;
drying said ceramic paint to bond said ceramic paint to said coatable surface of said long glass templet;
applying electrically conductive bus bars to said coatable surface of said long glass templet;
drying said bus bars to bond said bus bars to said coatable surface of said long glass templet;
uniting said long glass templet and said short glass templet;
bending said long glass templet and said short glass templet to form a shaped windshield pair;
separating said long templet and said short templet forming said shaped windshield pair;
applying a transparent electrically conductive coating between said bus bars located on said coatable surface of said long glass templet;
uniting said long glass templet and said short glass templet with an interposed laminating interlayer therebetween; and
laminating said long glass templet and said short glass templet with said interposed laminating interlayer thereby to achieve a shaped laminated windshield which is heatable by the flow of electrical energy therethrough.

3. A method for making an electrically heatable windshield of laminated construction, which comprises the steps of:
cutting a pair of glass templates, said templates including a long glass template and a short glass templet;
separating said long and said short glass templet from one another;
applying an opaque ceramic paint to an edge portion of a coatable surface of said short glass templet which will face a laminating interlayer when the windshield is in an installed position in a vehicle;
drying said ceramic paint to bond said ceramic paint to said coatable surface of said short glass templet;
applying electrically conductive bus bars to said coatable surface of said short glass templet;
drying said bus bars to bond said bus bars to said coatable surface of said short glass templet;
uniting said long glass templet and said short glass templet;
bending said long glass templet and said short glass templet to form a shaped windshield pair;
separating said long templet and said short templet forming said shaped windshield pair;
applying a transparent electrically conductive coating between said bus bars located on said coatable surface of said short glass templet;
uniting said long glass templet and said short glass templet with an interposed laminating interlayer therebetween; and
laminating said long glass templet and said short glass templet with said interposed laminating interlayer thereby to achieve a shaped laminated windshield which is heatable by the flow of electrical energy therethrough.

* * * * *